Nov. 11, 1952 D. J. DAVIS 2,617,424
SPRING TYPE HUSKING PEG
Filed Aug. 26, 1949 2 SHEETS—SHEET 1

INVENTOR.
DWILLARD J. DAVIS
BY
*Alden W. Redfield*
ATTORNEY

Nov. 11, 1952        D. J. DAVIS        2,617,424

SPRING TYPE HUSKING PEG

Filed Aug. 26, 1949        2 SHEETS—SHEET 2

INVENTOR.
DWILLARD J. DAVIS
BY
ATTORNEY

Patented Nov. 11, 1952

2,617,424

UNITED STATES PATENT OFFICE 2,617,424

SPRING TYPE HUSKING PEG

Dwillard J. Davis, Detroit, Mich., assignor to Avco Manufacturing Corporation, Cincinnati, Ohio, a corporation of Delaware Application August 26, 1949, Serial No. 112,568

4 Claims. (Cl. 130—5)

The present invention relates to an improved spring type husking peg for use in conjunction with husking rolls for removing the husks or shucks from ears of corn.

Often in the past, wooden plugs, made from maple or similar hardwood, were driven into holes, provided in the husking rolls, and thereafter the excessive portions of the plugs, projecting beyond the surface of the husking rolls, were removed by hand grinding. Metal husking blades were thereafter driven into the wooden plugs and were allowed to project beyond the surface of the husking rolls for engagement with the ears of corn to be husked.

Husking pegs of the type previously provided by the farm equipment manufacturers generally have proved unsatisfactory. In addition to being time consuming and expensive to install, the pegs have not proved durable in service. For one thing, the metal husking blade, driven into the maple plug, frequently split the plug, thus permitting the blade and plug to fall out after a very limited period of use.

Naturally, with the failure of each husking peg, the utility and efficiency of the husking machinery was decreased proportionally and, in addition, sand, water and other foreign matter were permitted to enter the interior of the husking rolls through the apertures left where the husking pegs had fallen out. The foreign matter, accumulated within the husking rolls, increased the over-all weight of the machinery and added to the load pulled by the associated traction machinery.

Farmers universally have been vexed by the unsatisfactory quality and lack of durability of husking pegs. Frequently, farmers, urgently in need of the use of their equipment, improvised husking pegs to replace those that had fallen from the husking rolls by driving any available wooden plugs into the apertures and then driving nails into the plugs, the nails being bent at an angle to simulate the missing husking blades. Needless to say, the effectiveness of the machinery repaired in this manner was materially decreased.

In view of the foregoing history of husking pegs, it is an object of the present invention to provide a husking peg of improved durability which is simple and economical to manufacture.

It is a further object of the present invention to provide an improved one piece husking peg which can be easily and rapidly installed in a husking roll without the use of any special tools and without requiring hand finishing operations of any sort after installation.

Still another object of the present invention is to provide an improved husking peg which can be readily installed in or removed from a husking roll by inexperienced, unskilled people in the field.

It is also an object of the present invention to provide an improved husking peg which, when installed in a husking roll, remains as originally installed after prolonged service in the field.

A further object of the present invention is to provide a husking peg which forms an outlet through which foreign matter may drain from the interior of the husking roll.

The novel features that I consider characteristic of my invention are set forth in the appended claims. The invention itself, however, both as to its organization and method of operation, together with additional objects and advantages thereof, will best be understood from the following description of a specific embodiment when read in conjunction with the accompanying drawings in which:

Figure 2:
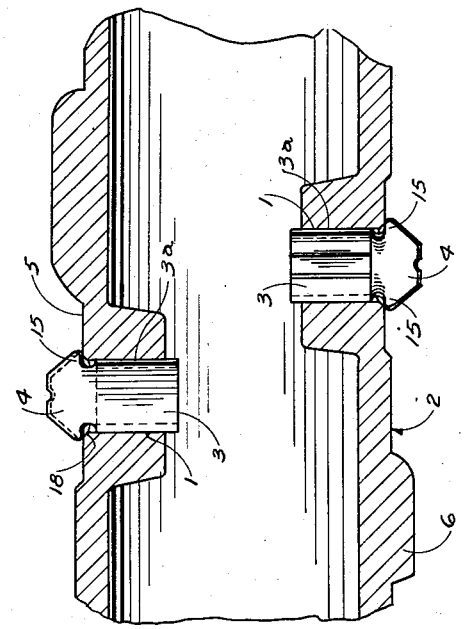
Figure 2 is a longitudinal sectional view of a husking roll taken on plane 2—2 of Figure 1, showing the longitudinal spacing of the husking pegs relative to the husking roll.
Figure 1:
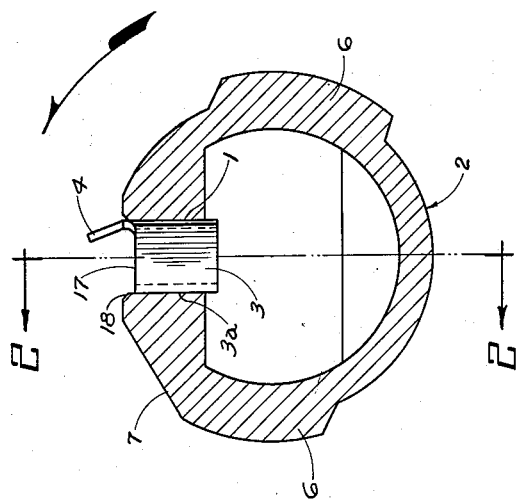
Figure 1 is a cross sectional view of a husking roll, showing an improved spring type husking peg installed for cooperation therewith.

With reference to Figures 1 and 2, spring type husking pegs 1, made according to the present invention, are shown installed in a husking roll, generally designated 2, each husking peg comprising a cylindrical body section 3 which is driven securely into a hole 3a provided in the husking roll. Joined to the body section is a husking blade 4 which protrudes beyond exterior surface 5 of the husking roll which is variegated with bosses 6 and plane areas 7, in a manner well known in the art.

Husking rolls are usually employed in pairs, the two rolls being parallel and cooperatively disposed for opposed rotation to engage thereby ears of corn which are supplied to the rolls. As the husking rolls rotate, husking blades 4 dig into the outer shucks or husks of the corn and strip them from the ear leaving the stripped ear and its kernels undamaged.

Figure 3:
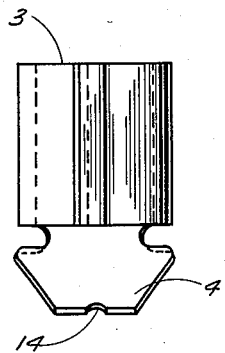
Figure 3 is a top plan view of the improved husking peg.
Figure 4:
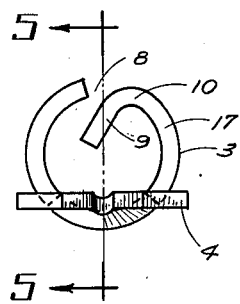
Figure 4 is an elevational view of the peg.

As shown in Figures 3 and 4, the cylindrical body section 3 of the husking peg has a circular cross section and is discontinuous along one of its elements, as at 8, to permit a contraction of its diameter as it is driven into hole 3a of the husking roll. A portion of the material which is formed into body section 3 is extended to form a plane section 9 connected to the body section proper by a radius portion 10. Plane section 9 is disposed to lie within the body section more or less along a radial plane.

Figure 6:
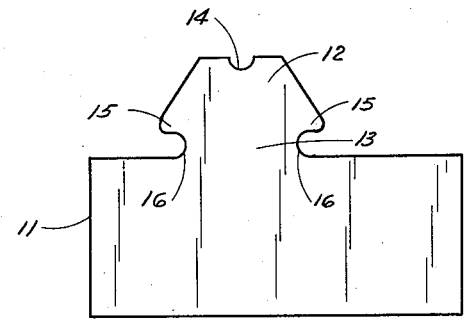
Figure 6 shows the shape of the stamped blank from which the improved peg is formed.

The stamped blank from which a husking peg is formed is shown in Figure 6. The rectangular part of the blank which is rolled into the body section 3 and section 9 is generally designated 11. The part of the blank which is provided to form the husking blade 4 is generally designated 12. A throat section 13 interconnects parts 11 and 12. Part 12 of the blank may be formed to a substantially trapezoidal shape, as shown in Figure 6, or may be formed into any desired shape which is capable of stripping the husks from the corn when suitably engaged therewith. A notch 14 is provided in the distal edge of the husking blade to decrease its continuous length in order to facilitate a ready penetration of the corn husks.

Throat section 13 is narrower than the adjacent cutting blade part 12, thus defining radius corners 15, as shown particularly in Figure 6. The edges of the throat are curved at 16 to facilitate a smooth transition from body section 3 to husking blade 4 in the completed husking peg and to aid in minimizing stress concentrations incidental to the forming operation.

Figure 5:
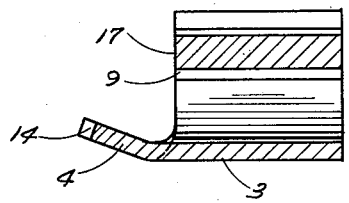
Figure 5 is a longitudinal sectional view of the peg taken on plane 5—5 of Figure 4, the view particularly showing the angular relationship between the husking blade and body section thereof.

As shown in Figure 5, husking blade 4 is bent to form an obtuse angle with the adjacent wall of the cylindrical body section. The angle used is a matter of choice and depends in part on the design of other cooperating elements of the machine. In the preferred embodiment herein described, it has been found desirable to make the obtuse angle equal to 159 degrees.

The husking blade retains a substantially plane form during fabrication of the husking peg from the stamped blank as shown in Figures 4 and 5. When installed in a husking roll the plane of the husking blade is disposed parallel to the axis of the roll.

The husking peg may be formed from a wide variety of materials although a material possessing a relatively high degree of resilience or springiness should be employed to provide the gripping action necessary when the husking peg is driven into the hole formed in the husking roll. Spring steel of .060 inch thickness has been found satisfactory when heat treated to a hardness reading of 45 to 55 on the Rockwell "C" scale.

It is very easy to install a husking peg in a husking roll. In order to install the peg, it is hit with a hammer on upper edge 17 of the body section and forced into hole 3a of the husking roll. A chamfer 18 may be provided at the exterior of the hole to facilitate the introduction of the husking peg thereinto. The peg is driven until corners 15 are resting on the exterior surface of the husking roll, as shown in Figure 2. As the peg is driven into the hole, it contracts in diameter which is possible because of the discontinuity provided at 8 and the resilience or springiness of the body section. The contraction in diameter in effect forms a forced fit in the roll and is sufficient to hold the pegs securely regardless of the service conditions to which they are subjected.

From the foregoing description of the installation of a peg it will be apparent that such pegs can be easily installed by inexperienced people in the field. No special tools whatsoever are required; in fact, the only tool necessary is a hammer or similar driving implement.

In the event that it is necessary to remove a peg from the roll this may be done simply and easily by gripping plane section 9 of the peg with any hooked implement and pulling the peg from the roll.

An advantage of the disclosed invention is that it is hollow and provides an outlet through which foreign matter, such as sand, water and mud, may drain from the interior of the rolls.

It is recognized that the improved type husking peg herein described could be made in a wide variety of forms. For instance, the body section could be conoidal in shape or even triangular; in fact, the shape of the husking peg body does not necessarily have to conform to the shape of the hole in the husking roll, it simply being necessary that some means be provided to enable the roll to grip the peg.

Having described a preferred embodiment of my invention, I claim:

1. A spring type husking peg made from a unitary piece of resilient material comprising a hollow substantially cylindrical body section, which is discontinuous along one of its cylindrical elements and has a portion thereof bent inwardly toward the axis of said cylindrical body section, a planar husking blade disposed at an angle relative to said body section and extending laterally beyond its adjacent portions, and a relatively narrow throat section joining said blade and said body section.

2. A spring type husking peg for frictional retention within a cylindrical hole formed within a husking roll, said peg comprising a hollow substantially cylindrical body section which is discontinuous along one of its cylindrical elements and has a portion thereof bent inwardly toward the center axis of said cylindrical body section, a planar husking blade disposed at an angle relative to said body section, a relatively narrow throat section joining said blade and said body section, and means formed integrally with the husking peg to limit its penetration into the cylindrical hole of the husking roll.

3. A spring type husking peg for frictional retention within a cylindrical hole formed within a husking roll, said peg comprising a hollow substantially cylindrical body section which is discontinuous along one of its cylindrical elements, a substantially triangular planar husking blade bent at an angle toward the axis of said body section, a relatively narrow throat section joining said blade and said body section, and means formed integrally with the husking peg and extending laterally thereof to limit its penetration into the cylindrical hole of the husking roll.

4. A spring type husking peg for frictional retention within a cylindrical hole formed within a husking roll, said peg comprising a hollow substantially cylindrical body section which is discontinuous along one of its cylindrical elements, a substantially triangular planar husking blade bent at an angle toward the axis of said body section, a relatively narrow throat section joining the base of said blade and said body section, the base of said blade adjacent said throat projecting laterally to limit penetration of the peg into the cylindrical hole of the husking roll.

DWILLARD J. DAVIS.

REFERENCES CITED

The following references are of record in the file of this patent:

UNITED STATES PATENTS

| Number | Name | Date |
|---|---|---|
| 69,258 | Sechrist | Sept. 24, 1867 |
| 613,249 | Creider | Nov. 1, 1898 |
| 937,715 | Purdy | Oct. 19, 1909 |
| 1,207,189 | MacGregor | Dec. 5, 1916 |
| 1,445,558 | Ring | Feb. 13 1923 |
| 2,160,306 | Coultas | May 30, 1939 |
| 2,391,846 | Scranton | Dec. 25, 1945 |

FOREIGN PATENTS

| Number | Country | Date |
|---|---|---|
| 116,037 | Great Britain | May 30, 1918 |